United States Patent
Fujimoto et al.

(10) Patent No.: US 10,322,747 B2
(45) Date of Patent: Jun. 18, 2019

(54) CONTROL DEVICE FOR A VEHICLE AND VEHICLE CONTROL METHOD

(71) Applicant: Mitsubishi Electric Corporation, Tokyo (JP)

(72) Inventors: Chiaki Fujimoto, Tokyo (JP); Tomoya Itsuji, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 109 days.

(21) Appl. No.: 15/519,239

(22) PCT Filed: Nov. 26, 2014

(86) PCT No.: PCT/JP2014/081242
§ 371 (c)(1),
(2) Date: Apr. 14, 2017

(87) PCT Pub. No.: WO2016/084160
PCT Pub. Date: Jun. 2, 2016

(65) Prior Publication Data
US 2017/0233000 A1    Aug. 17, 2017

(51) Int. Cl.
*B62D 5/04* (2006.01)
*B60W 50/04* (2006.01)
(Continued)

(52) U.S. Cl.
CPC ......... *B62D 5/0487* (2013.01); *B60W 50/035* (2013.01); *B60W 50/04* (2013.01);
(Continued)

(58) Field of Classification Search
CPC ...... B62D 5/0487; B62D 5/04; B62D 5/0463; B62D 5/0496; B60W 50/035; B60W 50/04
(Continued)

(56) References Cited

U.S. PATENT DOCUMENTS

| | | | | |
|---|---|---|---|---|
| 2004/0122563 A1* | 6/2004 | Okada | .................... | G05B 23/00 701/1 |
| 2009/0248241 A1* | 10/2009 | Ishii | ....................... | G07C 5/085 701/33.4 |

(Continued)

FOREIGN PATENT DOCUMENTS

| | | |
|---|---|---|
| JP | 2006-161604 A | 6/2006 |
| JP | 2010-173494 A | 8/2010 |

(Continued)

OTHER PUBLICATIONS

Communication dated Jun. 18, 2018 from the European Patent Office in counterpart European application No. 14906702.7.

(Continued)

*Primary Examiner* — Yazan A Soofi
(74) *Attorney, Agent, or Firm* — Sughrue Mion, PLLC; Richard C. Turner

(57) ABSTRACT

Vehicle state information is input, and a control amount, which is control state information, is calculated from the vehicle state information to control a controlled device. A control state is monitored by a monitor unit, and an abnormality is detected based on a state where the vehicle state information or the control state information exists in an abnormality region in which the vehicle state information or the control state information has not reached a failure region corresponding to a failure. The vehicle state information, the control state information, and monitor information are stored in a buffer for a period set in advance while always updating the latest vehicle state information, control state information, and monitor information. When the abnormality is detected, the above respective information before and after the abnormality detection including the information stored in the buffer are stored in a nonvolatile storage unit.

11 Claims, 7 Drawing Sheets

(51) Int. Cl.
*B60W 50/035* (2012.01)
*B62D 6/00* (2006.01)
*G06F 3/06* (2006.01)
*G07C 5/00* (2006.01)
*G07C 5/08* (2006.01)

(52) U.S. Cl.
CPC ............ *B62D 5/04* (2013.01); *B62D 5/0463* (2013.01); *B62D 5/0496* (2013.01); *B62D 6/00* (2013.01); *G06F 3/061* (2013.01); *G06F 3/0656* (2013.01); *G06F 3/0679* (2013.01); *G07C 5/008* (2013.01); *G07C 5/085* (2013.01); *G07C 5/0808* (2013.01); *G07C 5/0841* (2013.01); *G07C 2205/02* (2013.01)

(58) Field of Classification Search
USPC .......................................................... 701/41
See application file for complete search history.

(56) References Cited

U.S. PATENT DOCUMENTS

| 2011/0035108 | A1* | 2/2011 | Yamashita | ........... B62D 5/0463 |
| | | | | 701/41 |
| 2012/0145472 | A1* | 6/2012 | Imamura | ................ B62D 5/046 |
| | | | | 180/446 |
| 2012/0166039 | A1 | 6/2012 | Kitagawa et al. | |
| 2013/0090804 | A1 | 4/2013 | Oda et al. | |
| 2013/0253770 | A1* | 9/2013 | Nishikawa | ............. B62D 6/003 |
| | | | | 701/42 |
| 2014/0215119 | A1 | 7/2014 | Fujii | |

FOREIGN PATENT DOCUMENTS

| JP | 2010-195125 A | 9/2010 |
| JP | 2012-140053 A | 7/2012 |
| JP | 2013-080431 A | 5/2013 |
| JP | 2013-147248 A | 8/2013 |
| JP | 2013-216276 A | 10/2013 |
| JP | 2014-093844 A | 5/2014 |
| JP | 2014-149568 A | 8/2014 |

OTHER PUBLICATIONS

International Search Report for PCT/JP2014/081242 dated Feb. 10, 2015 [PCT/ISA/210].

Written Opinion for PCT/JP2014/081242 dated Feb. 10, 2015 [PCT/ISA/237].

* cited by examiner

CONTROL DEVICE FOR A VEHICLE AND VEHICLE CONTROL METHOD

CROSS REFERENCE TO RELATED APPLICATIONS

This application is a National Stage of International Application No. PCT/JP2014/081242 filed Nov. 26, 2014, the contents of all of which are incorporated herein by reference in their entirety.

TECHNICAL FIELD

The present invention relates to a control device for a vehicle, and more particularly, to recording of a vehicle state and a control state before and after an abnormality, which is a behavior that has not reached a failure but is different from normality.

BACKGROUND ART

Hitherto, in a vehicle failure diagnostic device, there is a device for storing, when a failure occurs, various types of data in a predetermined period from a time point of the failure and subsequently reading and analyzing the data, thereby recognizing a state of the vehicle at the time of the failure occurrence, a cause of the failure, and the like. Moreover, the amount of the stored data may become excessively large, and hence a storage device is configured to store the data only for the predetermined period without storing the other data, thereby restricting the data amount (refer to Patent Literature 1).

CITATION LIST

Patent Literature

[PTL 1] JP 4403959 B2
[PTL 2] JP 2002-238293 A

SUMMARY OF INVENTION

Technical Problem

In a device disclosed in Patent Literature 1, data for a predetermined period starting from an occurrence of an event that is likely to be a so-called failure is stored. This failure is also reported to a driver, and a cause of the failure is finally traced. However, the failure does not frequently occur. Rather, the vehicle presents a behavior different from an ordinary behavior during normal (ordinary) vehicle travel more frequently. In this case, the driver considers the behavior different from the ordinary behavior as being likely to be a failure, or the driver feels that the behavior is not a failure but something is wrong with the vehicle. In other cases, there is a behavior that is overlooked. Such behaviors are separated from a "failure", and are considered as an "abnormality". Moreover, a state without a "failure" or an "abnormality" is considered as "normality". When the overlooked abnormality occurs several times, the driver may notice the abnormality and contact a repair shop.

However, in the related-art device, there is no trace or record relating to this "abnormality". Thus, a component with an "abnormality" is considered to have "No Trouble Found (NTF)" or "No Defect Found (NDF)", and is determined to be a non-defective component. When this abnormality sporadically occurs, discontent and distrust of the driver may be aggravated.

The present invention has been made in view of the above-mentioned problem, and has an object to provide a control device for a vehicle and a vehicle control method for storing a state at the time when an abnormality, which is a behavior that is different from a failure but is different from normality, is detected, thereby using the stored state to recognize the state of the abnormality more precisely later and find out the cause of the abnormality.

Solution to Problem

According to one embodiment of the present invention, there are provided a control device for a vehicle and the like, including: a control processing unit configured to control the vehicle; a monitor unit configured to monitor a state of the vehicle and a control state; and a nonvolatile storage unit, in which the control processing unit includes: a vehicle control part configured to: input a plurality of pieces of vehicle state information on the state of the vehicle; calculate a control amount, which is control state information, from the vehicle state information; output a control signal for controlling a controlled device; and use the monitor unit to monitor the control state; an abnormality detection part configured to detect an abnormality based on a state where the vehicle state information or the control state information exists in an abnormality region in which the vehicle state information or the control state information has not reached a failure region corresponding to a failure; and a data storage control part configured to: store, in a buffer included in the control processing unit, the vehicle state information, the control state information, and monitor information for a period set in advance while always updating the latest vehicle state information, control state information, and monitor information; and store in the nonvolatile storage unit, when the abnormality is detected, the vehicle state information, the control state information, and the monitor information before and after the abnormality detection including the information stored in the buffer.

Advantageous Effects of Invention

According to the present invention, it is possible to provide the control device for a vehicle and the vehicle control method for storing the state at the time when the abnormality, which is the behavior that is different from the failure but is different from the normality, is detected, thereby using the stored state to recognize the state of the abnormality more precisely later and find out the cause of the abnormality.

DESCRIPTION OF EMBODIMENTS

Now, a control device for a vehicle and a vehicle control method according to each of embodiments of the present invention are described with reference to the drawings. In each of the embodiments, the same or corresponding portions are denoted by the same reference symbols, and the overlapping description thereof is omitted.

First Embodiment

Figure 1:
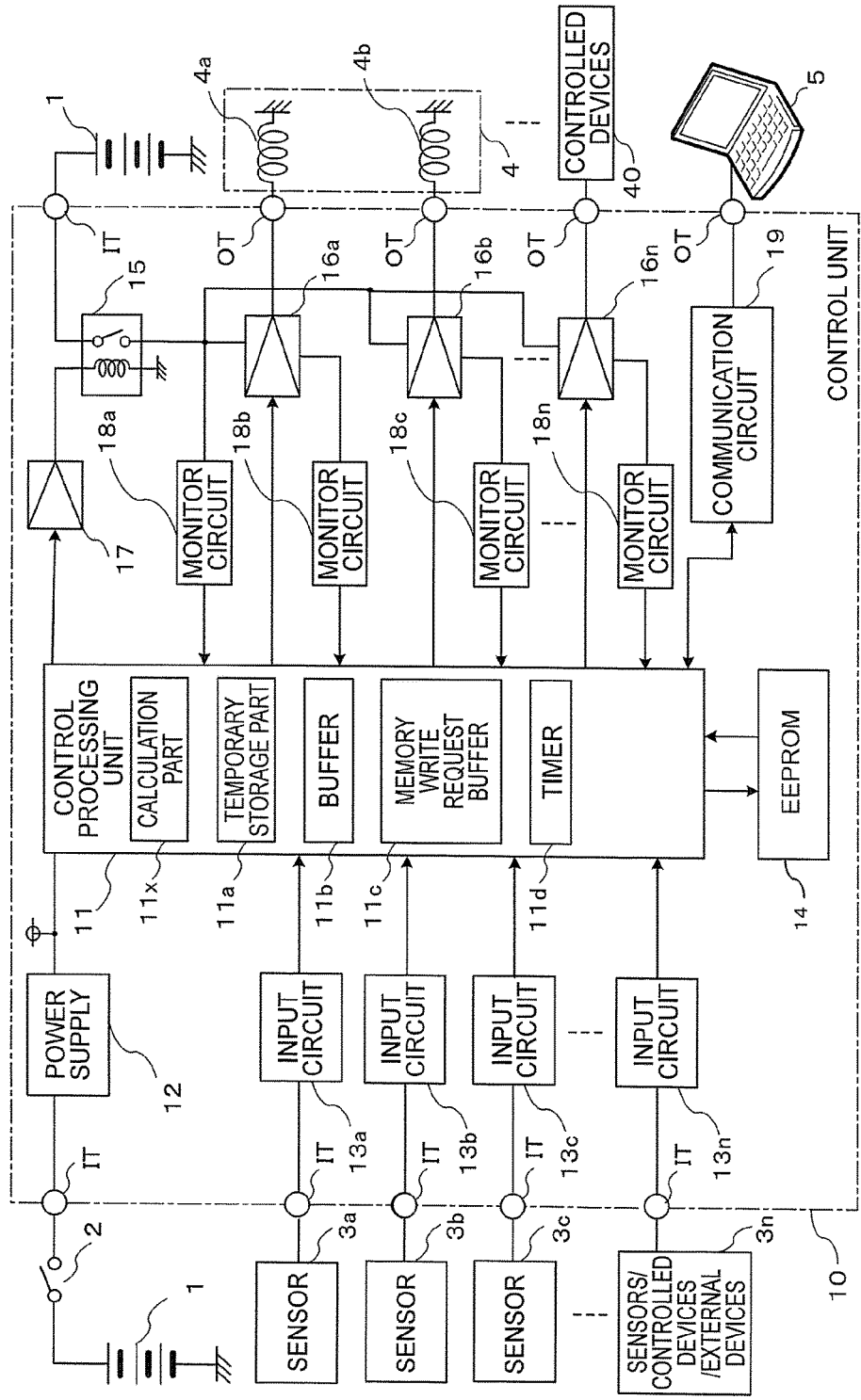
FIG. 1 is a diagram for illustrating an example of a configuration of a control device for a vehicle according to the present invention.

FIG. 1 is a diagram for illustrating an example of a configuration of a control device for a vehicle according to the present invention. Voltages of batteries 1, which are power supplies, and detection signals from respective sensors 3a to 3c (sensor group) are input from a vehicle side to a control unit 10 of the control device for a vehicle respectively via input terminals IT. The voltages of the batteries 1 are each input via an ignition switch 2. Input is also received from a plurality of other sensors, controlled devices, and external devices (3n), and the like. For convenience of description, the batteries 1 are illustrated on both of input and output sides on left and right sides of the control unit 10 of FIG. 1, but those batteries 1 are the same battery.

Meanwhile, the control unit 10 is configured to output control signals, which are output signals, for control to one or a plurality of controlled devices 40 including actuators and motors respectively via output terminals OT. An actuator 4, which is illustrated as an example of the controlled device 40, is constructed of solenoid coils 4a and 4b, for example. Moreover, the output terminal OT is provided for communication to/from a diagnostic tool 5 for diagnosing an "abnormality", which is a behavior different from normality, and a failure.

The control unit 10 includes a power supply 12 (e.g., 5 V DC constant power supply), a control processing unit 11 for carrying out calculation of control amounts and the like, respective input circuits 13a to 13n for the sensors, the controlled devices, the external devices (3a to 3n), and the like, a relay 15 for supplying/shutting off power to the respective controlled devices 4 and 40 including the actuator 4 and the like as an output side, a relay drive circuit 17 for the relay 15, solenoid drive circuits 16a and 16b for driving the solenoid coils 4a and 4b of the exemplified actuator 4, monitor circuits 18a to 18n constructing a monitor unit, and a communication circuit 19 for communicating to/from the diagnostic tool 5.

A drive circuit 16n is illustrated for the controlled device 40 in FIG. 1, but the drive circuits 16 are each constructed of, for example, an amplifier, an interface, and the like for a controlled device to which a control signal is simply transmitted from the control unit 10.

The control processing unit 11 includes a calculation part 11x, a temporary storage part (volatile storage part) 11a, a buffer 11b, a memory write request buffer 11c, and a timer 11d. The calculation part 11x, which is a central processing unit (CPU), is configured to carry out various types of calculation and control, for example, in accordance with programs stored in advance in a nonvolatile storage unit 14 described later.

Figure 2:
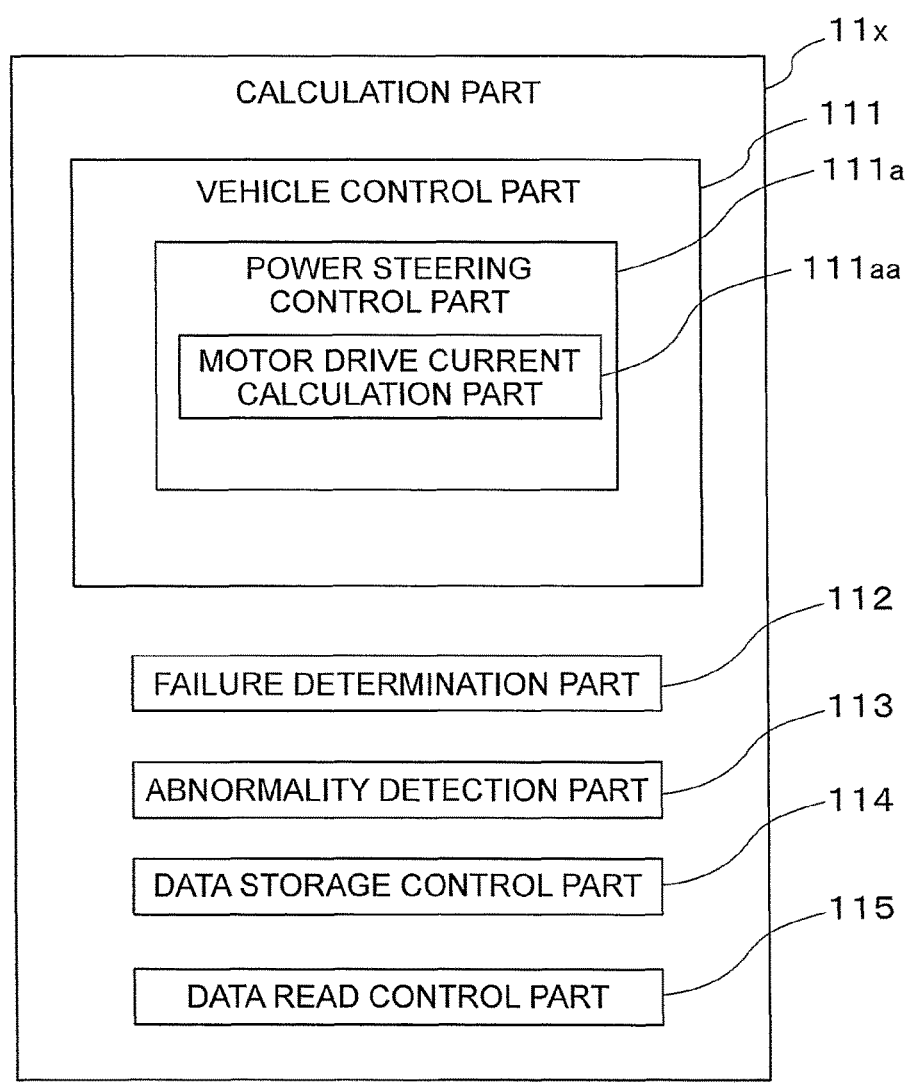
FIG. 2 is a functional block diagram for illustrating an example of a configuration of a calculation part of a control processing unit of the control device for a vehicle according to the present invention.

FIG. 2 is a processing functional block diagram for illustrating an example of the calculation part 11x. A vehicle control part 111 and a failure determination part 112, which are generally implemented in the control device for a vehicle, are also included in the calculation part 11x of FIG. 2. An abnormality detection part 113, a data storage control part 114, and a data read control part 115, which are features of the present invention, are further included. A power steering control part 111a including a motor drive current calculation part 111aa described later in a fourth embodiment of the present invention as an example of the vehicle control is illustrated in the vehicle control part 111.

The control unit 10 also includes the nonvolatile storage unit 14. The nonvolatile storage unit 14 is constructed of, for example, an electrically erasable programmable read-only memory (EEPROM) in which stored information does not disappear even when the power supply is shut off. The nonvolatile storage unit 14 is configured to write data and read stored data in accordance with commands from the control processing unit 11.

Figure 3:
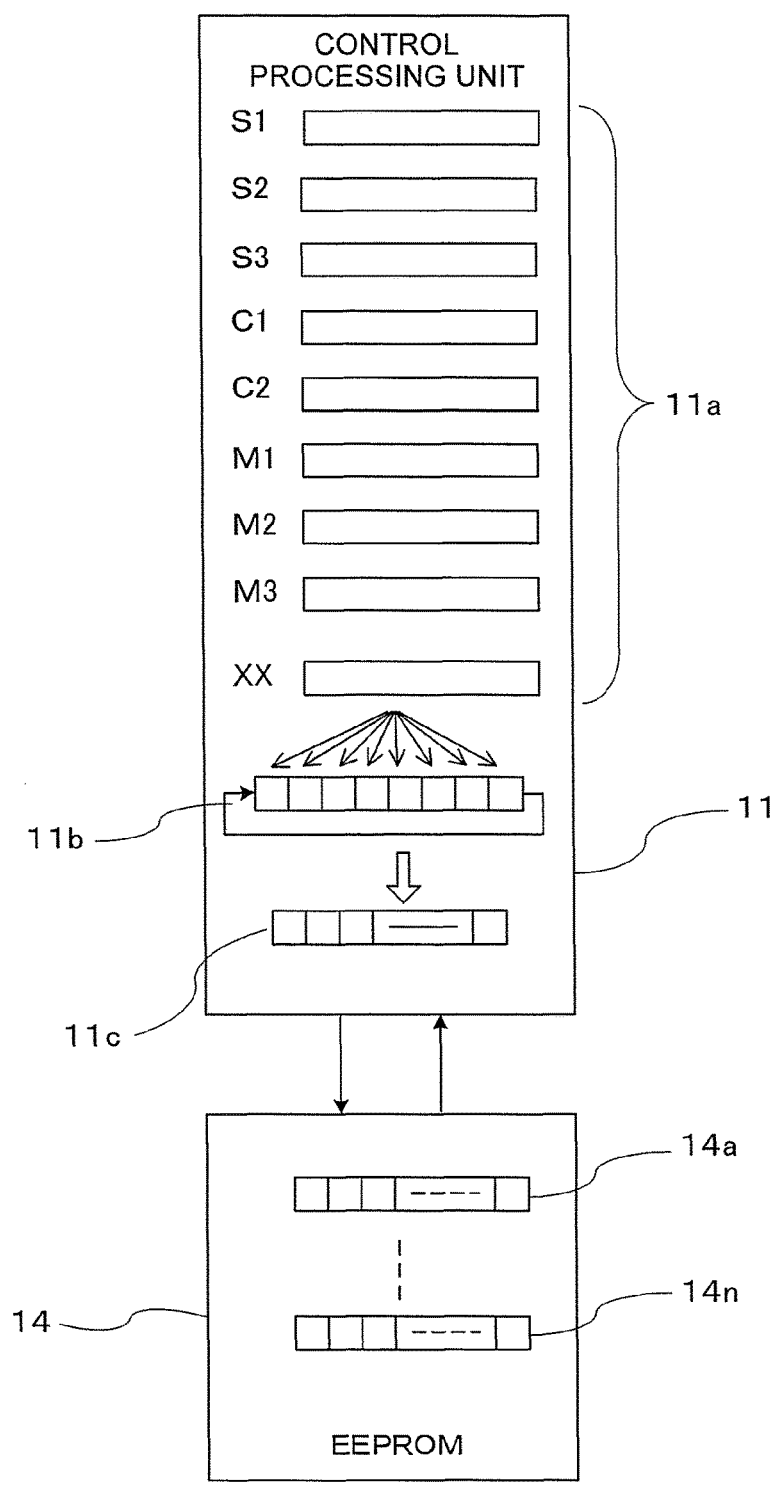
FIG. 3 is a diagram for illustrating transmission/reception of data between the control processing unit and a nonvolatile storage unit in the control device for a vehicle according to an embodiment of the present invention.

Referring to FIG. 3, a description is given of communication of data between the control processing unit 11 and the nonvolatile storage unit 14. The vehicle control part 111 of the calculation part 11x of the control processing unit 11 of FIG. 2 is configured to calculate control amounts (C1 and C2) formed of, for example, current values for driving the solenoid coils 4a and 4b of the actuator 4 based on input information (S1 to S3), which is vehicle state information, for example, from the sensors 3a to 3c. The control amounts are considered as control state information. Moreover, the vehicle control part 111 is configured to use the monitor circuits 18a to 18c to monitor whether or not the same currents as the control amounts are supplied to the solenoid coils 4a and 4b, and carry out feedback control in accordance with differences between the calculated control amount, namely, a target value, and each of monitored actual monitor values (M1 to M3). The monitor values are considered as monitor information.

The monitor values M1 to M3 are respectively the voltage of the battery 1, and the current values to the solenoid coils 4a and 4b.

In addition to the information illustrated in FIG. 3, data and information for the vehicle control, which are various types of the vehicle state information, the control state information, and the monitor information, exist in the control processing unit 11 illustrated in FIG. 3, and are used for vehicle control and failure determination by the existing vehicle control part 111 and failure determination part 112 of FIG. 2. The data storage control part 114 of FIG. 2 is configured to select the input information (S1 to S3), the control amounts (C1 and C2), and the monitor values (M1 to M3) out of the data and information in accordance with various abnormal states. In other words, those pieces of data are not newly input and calculated for the detection of the above-mentioned "abnormality", but data and information are selected for the abnormality detection and abnormality verification after the abnormality detection out of the data and information used for the vehicle control and the failure determination by the existing vehicle control part 111 and failure determination part 112. Those pieces of data are stored in the temporary storage part 11a constructed of, for example, a random access memory (RAM) integrated into the control processing unit 11, which is the same for other data XX.

Then, the data storage control part 114 is configured to write those pieces of data into another buffer 11b. The buffer 11b is constructed as, for example, a ring buffer. For example, the buffer 11b is a buffer which n times of the eight pieces of data (S1 to S3, C1, C2, and M1 to M3) to be written can be written to and held in. The vehicle control part 111 is configured to periodically input the input information (S1 to S3), calculate the control amounts (C1 and C2), and monitor the monitor values (M1 to M3). The n times of data means data corresponding to n times of a periodic operation.

Then, the oldest data is pushed out, and is deleted each time new data is successively input to the buffer 11b, and the n times of data is thus always kept in a written state. The old data is sequentially pushed out by the new data in this way, resulting in a ring buffer configuration.

When the abnormality detection part 113 of FIG. 2 detects an abnormality on this occasion, the data storage control part 114 transfers to the memory write request buffer 11c previous data, for example, for three times from the current time point in the buffer 11b. When the data of (8 pieces)×(3 times) is transferred to the memory write request buffer 11c, the data is written to memory blocks 14a to 14n existing in the nonvolatile storage unit 14.

Moreover, after the abnormality detection, the data storage control part 114 transfers the data for a duration of time set in advance or a number of times set in advance to the ring buffer 11b, further transfers the data to the memory write request buffer 11c, and also writes the data to the memory blocks 14a to 14n in the nonvolatile storage unit 14 for retention. As a result, the data in the period (duration of time or number of times) set in advance before the abnormality detection and the data in the period (duration of time or number of times) set in advance after the abnormality detection are stored.

In other words, the data storage control part 114 is configured to store in the buffer 11b the vehicle state information, the control state information, and the monitor information for the period set in advance while always updating the latest vehicle state information, control state information, and monitor information, and store in the nonvolatile storage unit 14, when the abnormality is detected, the vehicle state information, the control state information, and the monitor information before and after the abnormality detection including the information stored in the buffer 11b. Moreover, the data storage control part 114 is configured to transfer the vehicle state information, the control state information, and the monitor information to the memory write request buffer 11c, and then store the vehicle state information, the control state information, and the monitor information in the nonvolatile storage unit 14.

The timer 11d of the control processing unit 11 is used to count the period set in advance.

A description is now given of a method of reading the stored data when the driver recognizes the abnormality and brings the vehicle to a repair shop or a dealer.

As illustrated in FIG. 1, the diagnostic tool 5 is connected to the control unit 10 at the repair shop, and a predetermined operation for reading data is carried out on the diagnostic tool 5 by an operator. The calculation part 11x of the control processing unit 11 receives a data read command from the diagnostic tool 5 via the communication circuit 19. When the data read control part 115 receives the data read command, the data read control part 115 reads all the data stored in the nonvolatile storage unit 14 of FIG. 3 from the memory blocks 14a to 14n, or specific information in accordance with the command from the diagnostic tool 5, and transfers this information to the diagnostic tool 5 via the communication circuit 19. The operator carries out an operation on the diagnostic tool 5 of, for example, displaying the transferred data on a screen of the diagnostic tool 5, or printing the transferred data with a print device, thereby viewing the data before the occurrence of the abnormality and after the occurrence of the abnormality so as to verify the state of the abnormality and a cause therefor. In particular, the neighboring data other than the data presenting the abnormality can be acquired, resulting in more reliable verification of the cause of the occurrence of the abnormality.

The data stored before and after the abnormality occurrence can be read from the control unit 10 through the connection of the diagnostic tool 5 to the control unit 10 at any place, that is, the place is not limited to the repair shop and the dealer.

Figure 4:
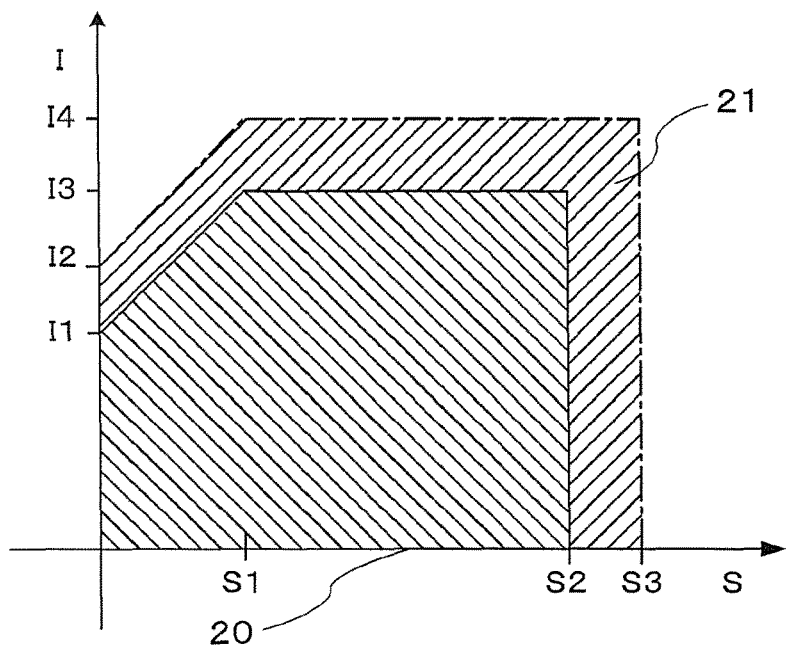
FIG. 4 is a graph for showing detection of an abnormality in the control device for a vehicle according to the embodiment of the present invention.
Figure 5:
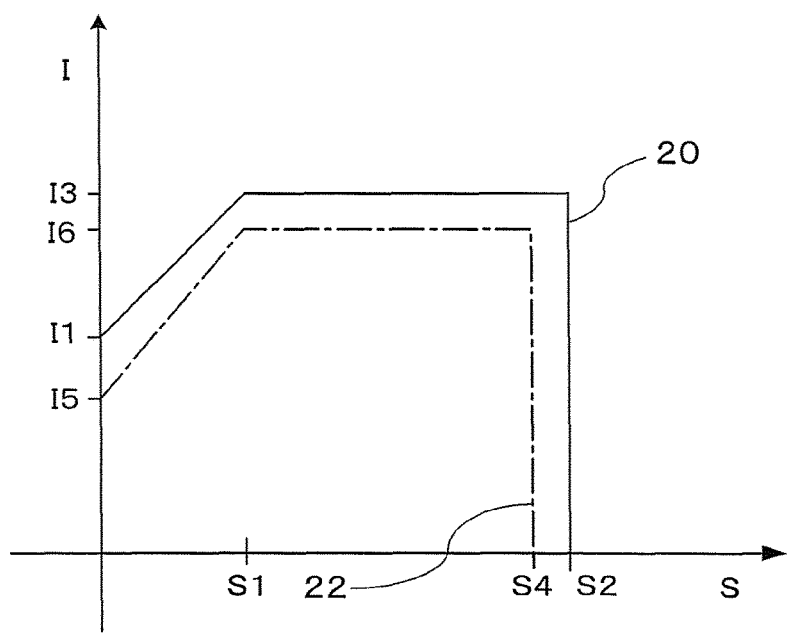
FIG. 5 is a graph for showing detection of an abnormality in the control device for a vehicle according to the embodiment of the present invention.

A description has been given of the operations for acquiring, writing, and reading the data during the abnormality. Referring to FIG. 4 and FIG. 5, a description is now given of how to detect the "abnormality" by the abnormality detection part 113 of the control processing unit 11. The "abnormality" is determined when the data is more than or less than a threshold set in advance, as in the case of the failure. The threshold set in advance is an intermediate value that hardly occurs during the normal control and does not reach a failure determination value.

In FIG. 4, a horizontal axis represents a sensor value S, and a vertical axis represents a current value I, which is a control amount. Those values take values in a normal region 20 (S1 to S2 and I1 to I3) in the normal control. When the sensor value or the current value enters an abnormality region 21 (S1 to S3 and I2 to I4), the state is determined to be abnormal. A region other than the normal region 20 and the abnormality region 21 is a failure region.

In FIG. 5, similarly, when the sensor value or the current value enters a region (S1 to S4 and I5 to I6) inside a long dashed short dashed line 22 slightly inside the normal region 20, the state is determined to be abnormal. In FIG. 5, the outside of the normal region 20 is the failure region.

More generally, the abnormality region is between the normal region and the failure region. In other words, a region that has not reached the failure region with respect to the normal region is set as the abnormality region. Alternatively, an abnormality detection threshold is between a normal value and a failure determination threshold, and each of the normality, the abnormality, and the failure is determined based on whether the value is equal to or more than, or less than the threshold, or more than or equal to, or less than the threshold.

When the abnormality detection part 113 detects a state where the sensor value or the control amount (e.g., the current value) becomes more than or less than the threshold that is unlikely to occur during the normal control set in advance in this way, the data stored before the abnormality occurrence and the data after the abnormality occurrence are stored in the nonvolatile storage unit 14. Not only the data for the abnormality determination but also a plurality of types of data relating to those pieces of data are stored in the nonvolatile storage unit 14.

As described above, the data selected in advance out of the data held and used by the control processing unit 11 is stored in the buffer, and the data for the period or the number of times set in advance before the abnormality detection is stored in the nonvolatile storage unit 14 at the time of the abnormality detection, thereby enabling the data to be read subsequently, and the state of the abnormality and the cause for the occurrence to be traced.

The abnormality detection is carried out by the abnormality detection part 113 in the above-mentioned example, but failure determination may simultaneously be made. In this case, when the vehicle state information or the control state information is in the failure region, and a failure is thus determined to exist by the failure determination part 112, as in the abnormality detection by the abnormality detection part 113, the data storage control part 114 writes the vehicle state information, the control state information, and the monitor information at the time of the failure determination by the failure determination part 112 in the nonvolatile storage unit 14 via the temporary storage part 11a, the ring buffer 11b, and the memory write request buffer 11c separately from the information on the abnormality detection.

Second Embodiment

A description is now given of a control device for a vehicle according to a second embodiment of the present invention. The configuration is basically the same as that of the embodiment illustrated in FIG. 1 to FIG. 5. The nonvolatile storage unit 14 can store only a finite amount of data. Moreover, the data for the failure occurrence also needs to be stored, and the data at the time of the abnormality detection thus needs to efficiently be stored. Therefore, data to be stored needs to be sorted and selected in accordance with a content of the abnormality. For example, it is assumed that the sensor 3a is a vehicle speed sensor, the sensor 3b is an engine rpm sensor, and the sensor 3c is a temperature sensor. Further, it is assumed that the abnormality occurs in the sensor 3a, that is, the vehicle speed sensor. Disconnections of a signal line, a power supply line, and a ground line and the like are failure occurrences, and are not the abnormality. On this occasion, it is assumed that an intermittent state where the vehicle speed signal is input or shut off occurs. This abnormality can easily be detected through the vehicle speed calculated at each interval set in advance by the vehicle control part 111 of the control processing unit 11, and the abnormality detection part 113 can thus determine that the probability of an input abnormality in the vehicle speed sensor is high.

The vehicle speed sensor abnormality is independent of the engine rpm of the sensor 3b. However, the vehicle speed sensor abnormality may be dependent on the temperature of the sensor 3c. Therefore, the data of the sensor 3b is not stored, but the data of the sensor 3c is stored. Moreover, the control amounts C1 and C2 may change in accordance with the vehicle speed, and are thus to be stored. However, the current values monitored by the monitor circuits 18b and 18c do not need to be stored. Further, the monitor circuit 18a indirectly monitors the battery voltage, and the battery voltage is to be stored.

As described above, for an abnormality that has occurred once, the data storage control part 114 excludes the data irrelevant to the abnormality and store only the data that is relevant to or likely to be relevant to the abnormality, thereby first determining in advance the data to be stored.

Moreover, abnormality occurrence date and time is data to be stored for all the abnormalities. Thus, there is data to be stored regardless of the type of abnormality.

The occurrence date and time may be added to all pieces of data, for example, based on the count of the timer 11d.

The memory capacity to be used is suppressed in consideration of the data amount. The abnormality of the intermittent state where the vehicle speed signal is input or shut off does not relate to a control amount, and thus the data amount may not need to be as precise as that used for the control amount calculation. In this case, data after the decimal point is truncated. For example, the temperature does not need to be as precise as 20.0 degrees, and thus the temperature after the decimal point is truncated to be 20 degrees. As a result, the storage capacity itself used on one piece of data can be decreased. In other words, the precision of data is considered.

Further, the number of times of storage of the stored data is decreased. Data greatly changing in a short period, e.g., the engine rpm, needs to be stored at short time intervals. Meanwhile, for example, data at every second is enough for the temperature and the like. Thus, the time interval for the storage is different, that is, may be a short period or a long period, depending on the type of the stored data, thereby suppressing the number pieces of stored data.

Based on the above-mentioned consideration, for each type of data relating to the abnormality detection, for example, for each of the abnormality types or each piece of data of the vehicle state information, the control state information, and the monitor information in which the abnormality is detected, a table indicating the types (types of data to be stored in the vehicle state information, the control state information, and the monitor information) of data to be stored, the number of digits of the stored data, and the storage interval is stored in advance in the nonvolatile storage unit 14 or the like, and the data storage control part 114 transfers the data to the memory write request buffer 11c based on the table, and stores the data in the nonvolatile storage unit 14.

More data effective for the abnormality verification can be stored by suppressing the type of the storage data, suppressing the number of digits of the storage data, and further restricting the storage interval so as to suppress the storage capacity of data.

Third Embodiment

A description is now given of the control device for a vehicle according to a third embodiment of the present invention. The configuration is basically the same as that of the embodiments illustrated in FIG. 1 to FIG. 5. A description is now given of deletion and overwriting of the data stored when the abnormality occurs. One type of the deletion of the stored data is deletion of the stored data based on a deletion command by the diagnostic tool 5. When the diagnostic tool 5 acquires necessary information, the acquired data is no longer necessary, and deletion of the data thus poses no problem.

The storage of the data on the abnormality is limited depending on the storage capacity of the nonvolatile storage unit 14. Therefore, first, the data storage control part 114 stores only new or latest data (information) for data (information) on the same abnormality. This is because, when the same abnormality occurs, past data can be easily deleted by overwriting a past data storage region, resulting in a decrease in the storage capacity.

When different types of abnormality occur, and no vacancy exists in the storage capacity, the abnormalities are stored in accordance with a predetermined priority set in advance. As a result of this determination, an abnormality determined to be more important in advance is stored more preferentially. The important abnormality is an abnormality greatly affecting vehicle travel. Regarding abnormalities at the same level, an abnormality that occurred later is stored. Further, when an abnormality occurs, and an abnormal value returns to a normal value within a period set in advance, corresponding data (information) may be deleted to allow another abnormality to use the storage region that has been used for this corresponding data.

The priority of the storage is also added to the table in the nonvolatile storage unit 14 according to the second embodiment.

As described above, the nonvolatile storage unit 14 can be effectively used by the deletion and the overwriting of the storage data, and thus data having higher necessity can be stored.

Fourth Embodiment

Figure 6:
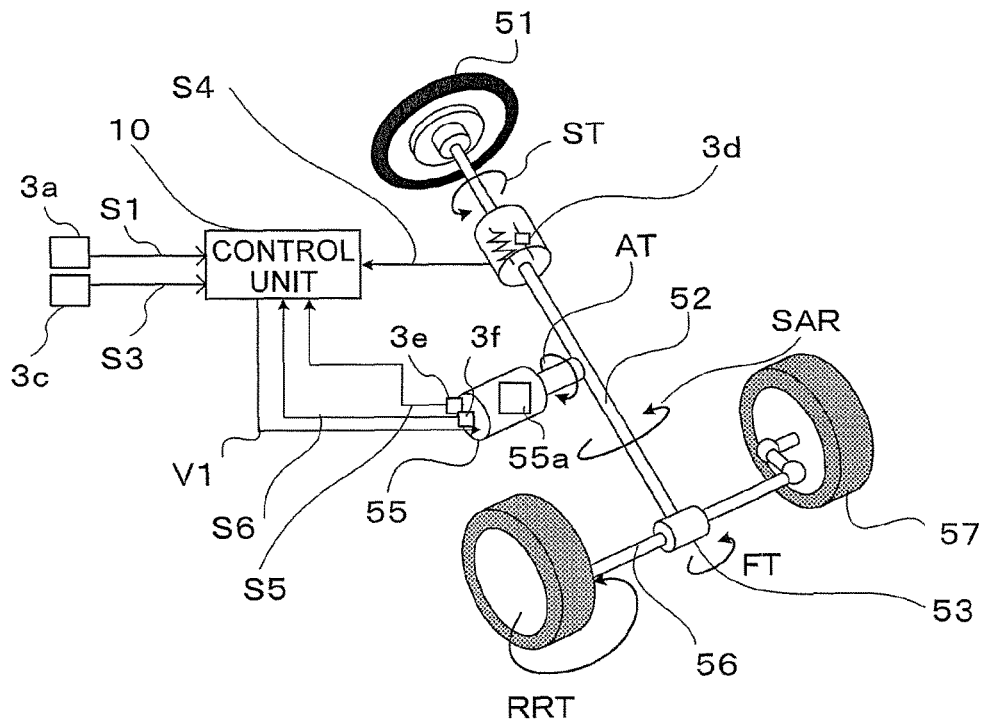
FIG. 6 is a diagram for illustrating a specific example of a part of a control device for a vehicle according to a fourth embodiment of the present invention.

FIG. 6 is a diagram for illustrating a specific example of a part of a control device for a vehicle according to a fourth embodiment of the present invention. FIG. 6 is a diagram for illustrating an overall configuration of a part of a representative electric power steering control device system according to the present invention. In the electric power steering control device system, the following configuration is provided. Specifically, an assist torque AT of a motor 55 including a motor driving machine 55a mounted to a steering shaft 52 is added to a steering torque ST of the driver transmitted from a steering wheel 51 to the steering shaft 52. Then, the torques added to each other are multiplied by a steering gear box 53, and the direction of tires 57 is changed via a rack and pinion mechanism 56.

A description is now given of a dynamic/electric configuration. An electric power steering control device has a main function of generating the assist torque AT in accordance with the steering torque ST of the driver. In terms of electricity, the steering torque ST when the driver steers the steering wheel 51 is detected by a torque sensor 3d, and a signal is transmitted as the steering torque detection signal S4 to the control unit 10. In the control unit 10, an applied voltage V1 (C3), which is a control amount for generating the assist torque AT, is calculated by the power steering control part 111a illustrated in FIG. 2 of the calculation part 11x of the control processing unit 11 from a voltage detection signal S5, a current detection signal S6, and the steering torque detection signal S4, which are the state amounts (vehicle state information) of the motor 55. Then, the calculated applied voltage V1 (C3) is applied to the motor driving machine 55a. The voltage detection signal S5 and the current detection signal S6 are acquired from a voltage sensor 3e and a current sensor 3f.

The torque sensor 3d, the voltage sensor 3e, and the current sensor 3f are sensors included in the sensors, the controlled devices, and the external devices (3a to 3n) of FIG. 1, and the steering torque detection signal S4, the voltage detection signal S5, and the current detection signal S6 are the input information (vehicle state information) to be input to the control unit 10 of FIG. 1.

A road surface reaction force torque RRT is applied to the tire 57. A friction torque FT and a steering shaft reaction force SAR are applied to the steering shaft 52.

In the control unit 10 of the electric power steering control device, a target value (control amount) of the current is calculated from the above-mentioned sensor signals in the motor drive current calculation part 111aa of FIG. 2. Then, current control is applied so that an actual current value (monitor value or the current detection signal S6) of the motor 55 matches the target value. The motor 55 generates a torque, which is a product of the current value, a torque constant, and a gear ratio (gear ratio between the motor and the steering shaft), thereby assisting the torque when the driver performs steering.

In a control example described later, the detection signals from the vehicle speed sensor 3a and the temperature sensor 3c are further input to the control unit 10. Those sensors are sensors included in the sensors, the controlled devices, and the external devices (3a to 3n) of FIG. 1.

Figure 7:
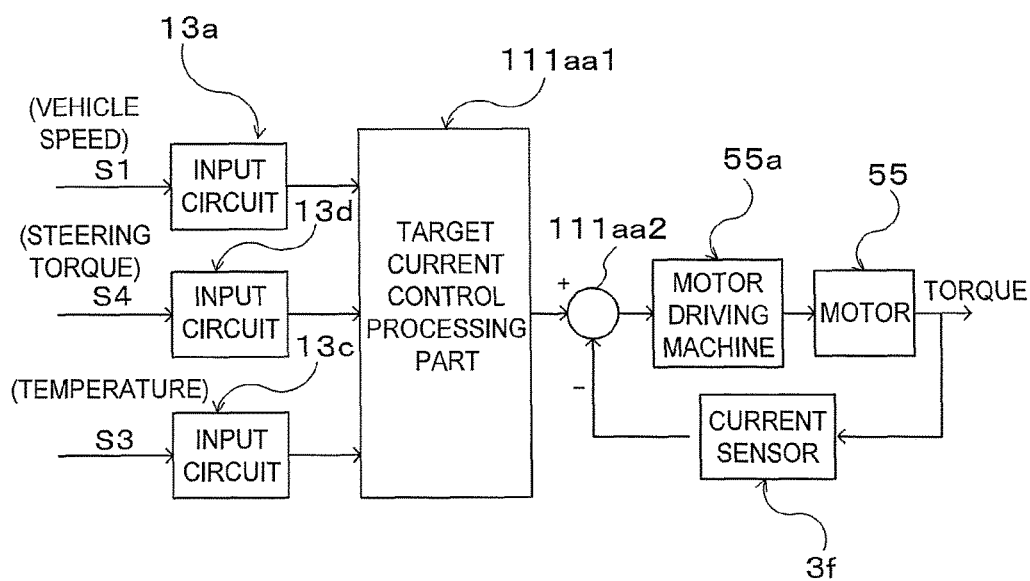
FIG. 7 is a functional block diagram for illustrating an example of a configuration of an electric power steering control device of FIG. 6.

FIG. 7 is a block diagram for illustrating the above-mentioned functions of the electric power steering control device. In FIG. 7, reference symbol 13a denotes an input circuit for inputting the vehicle speed detection signal S1 from the vehicle speed sensor 3a for detecting the vehicle speed, reference symbol 13d denotes an input circuit for inputting the steering torque detection signal S4 from the torque sensor 3d (refer to FIG. 6) for detecting the steering torque ST, reference symbol 13c denotes an input circuit for inputting the temperature detection signal S3 from the temperature sensor 3c for detecting the temperature inside the control processing unit 11, reference symbol 111aa1 denotes a target current control processing part configured to calculate the target current for the motor 55 through use of the detected vehicle speed, steering torque, and temperature, and the like, reference symbol 111aa2 denotes a subtractor for subtracting the current detected by the current sensor 3f (refer to FIG. 6) from output of the target current control processing part 111aa1, and reference symbols 55a, 55, and 3f respectively denote the motor driving machine for driving the motor, the motor, and the current sensor for detecting the motor current of FIG. 6.

The target current control processing part 111aa1 and the subtractor 111aa2 are constructed of the motor drive current calculation part 111aa of FIG. 2.

Figure 8:
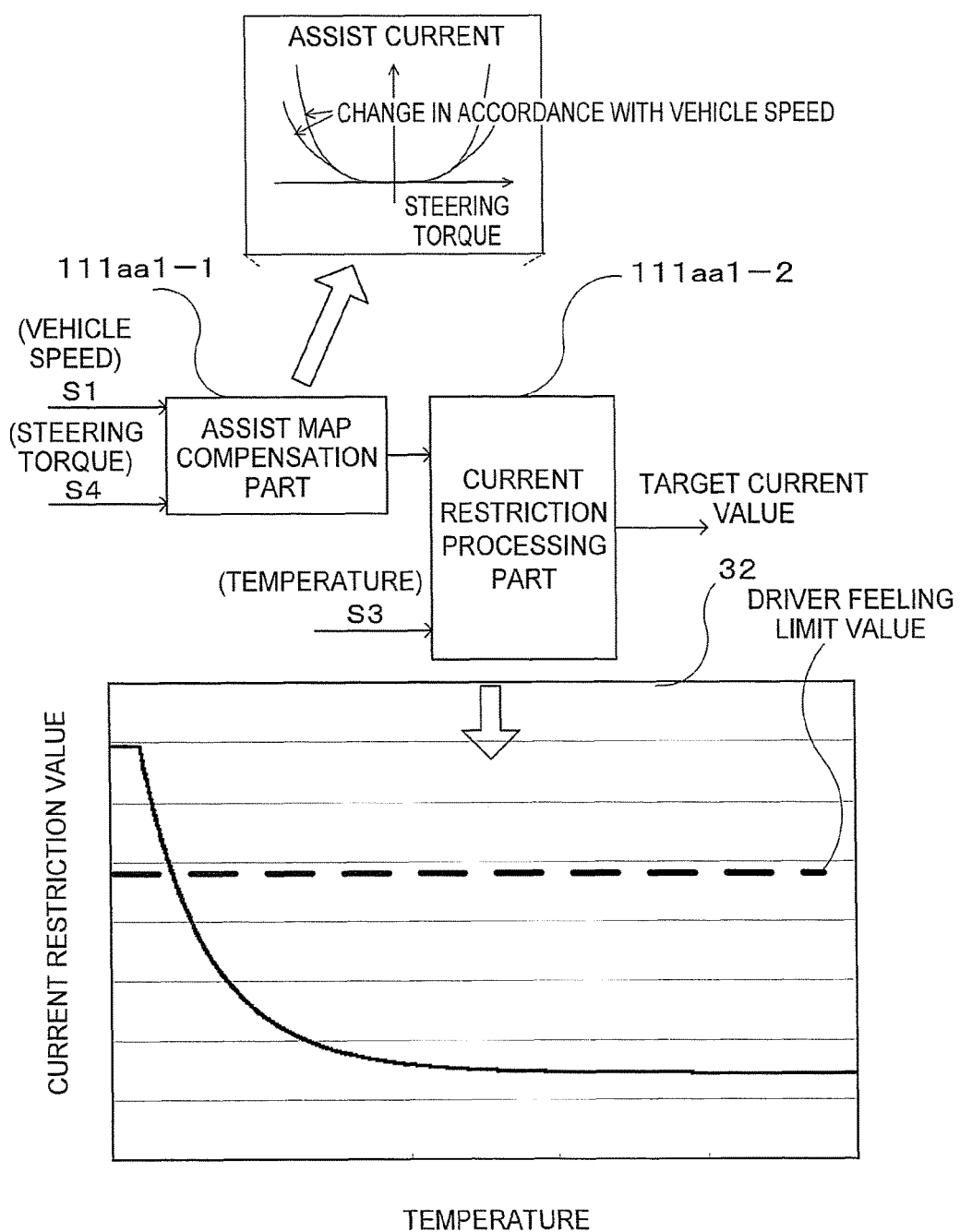
FIG. 8 is a functional block diagram for illustrating an example of an internal configuration of a target current control processing part of FIG. 7.

A description is now given of a method of calculating, by the target current control processing part 111aa1, the assist torque AT, which is the output torque of the motor 55. FIG. 8 is a functional block diagram for illustrating an example of an internal configuration of the target current control processing part 111aa1. As a representative control example, as schematically illustrated in FIG. 8, there is an assist map compensation part 111aa1-1 for acquiring the torque for assist from an assist map in accordance with the steering torque detection signal S4 from the torque sensor 3d and the vehicle speed detection signal S1 from the vehicle speed sensor 3a.

In contrast, a current restriction processing part 111aa1-2 is configured to restrict the current in a pattern set in advance in accordance with the temperature detection signal S3 from the temperature sensor 3c as denoted by reference numeral 32 of FIG. 8. In other words, output restriction is imposed on the motor. Instructed current instructed by the assist map compensation part 111aa1-1 is restricted by the current restriction processing part 111aa1-2, thereby acquiring the target current value (control amount) serving as an assist torque amount.

Other compensations, e.g., compensation control of suppressing a high revolution of the motor 55, exist for the electric power steering control, but are herein omitted. The other compensation control involves adding a compensation value for the compensation control to the output of the assist map compensation part 111aa1-1, then carrying out the processing by the current restriction processing part 111aa1-2, and then determining the target current value for controlling the motor. Moreover, even when the other compensations exist, the contents of the present invention still hold true.

On this occasion, the motor driving machine 55a or the motor 55 may generate heat when a large current continuously flows through the motor 55. When this flow of the current further continues, an overheat state is brought about, and the motor driving machine 55a or the motor 55 may be degraded in performance, or further fail. In order to prevent this phenomenon, the current restriction processing part 111aa1-2 is provided for overheat protection. The assist is usually carried out by using the current compensated based on the assist map, and a steering feeling that does not cause a sense of discomfort to the driver is provided. However, when the current is restricted by the current restriction processing part 111aa1-2, the assist amount is restricted, and the driver may feel the sense of discomfort when steering the steering wheel. The abnormality detection part 113 determines that the abnormality is detected when the current restriction becomes equal to or less than a current restriction (equal to or less than a threshold set in advance in accordance with a driver feeling limit value of FIG. 8) that may cause the sense of discomfort. The data storage control part 114 also stores the vehicle state information, the control state information, and the monitor information relating to the calculation by the motor drive current calculation part (111aa) in the buffer 11b. Then, when the abnormality is detected, the data storage control part 114 carries out processing of transferring the data to the memory write request buffer 11c illustrated in FIG. 1 and FIG. 3, and writing the information at that time, e.g., the current and the temperature, to the nonvolatile storage unit 14.

When the current is restricted for the overheat protection, the driver may feel that the failure has occurred as described above. However, there is actually no failure, and the processing for protecting the vehicle's own motor driving machine 55a or motor 55 in the assist control is being carried out. When the steering is not carried out for a while, the heat generation ceases, and the driver has a normal feeling again. Therefore, when the vehicle is later taken to a repair shop, such an explanation that a failure does not exist but the assist amount is restricted by the above-mentioned control can be given by analyzing the information written to the nonvolatile storage unit 14.

The present invention can be applied to the current restriction by a related-art temperature protection method for a DC brushless motor without a temperature sensor disclosed in Patent Literature 2.

Fifth Embodiment

Figure 9:
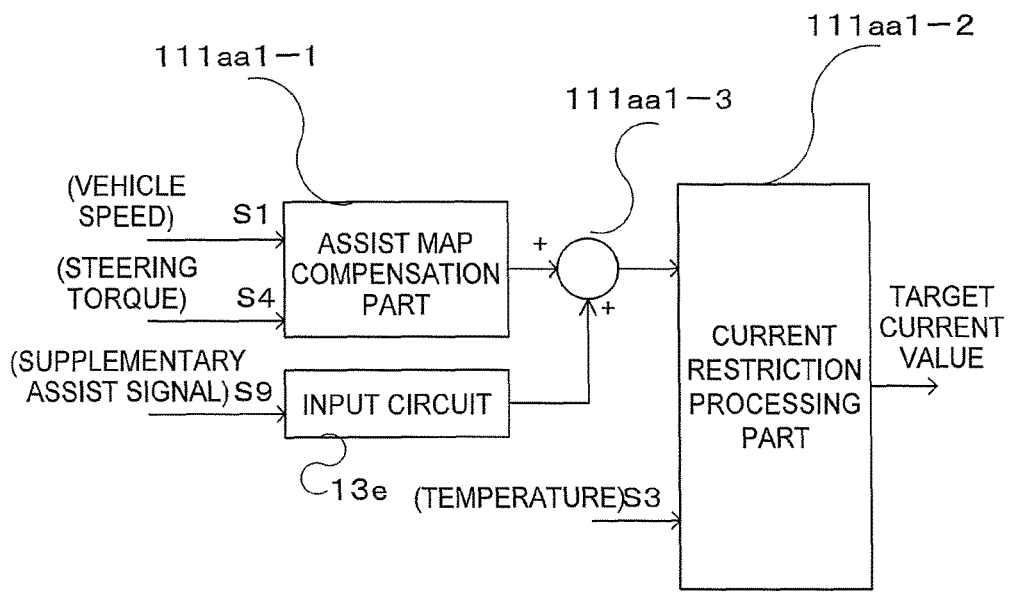
FIG. 9 is a functional block diagram for illustrating another example of the internal configuration of the target current control processing part of FIG. 7 in a control device for a vehicle according to a fifth embodiment of the present invention.

FIG. 9 is a functional block diagram for illustrating the target current control processing part of a control device for a vehicle according to a fifth embodiment of the present invention. FIG. 9 is a functional block diagram for illustrating a modified example of a configuration of the target current control processing part of FIG. 8. In addition to FIG. 8, a control configuration for a case where a supplementary assist signal S9 is input from a device other than the electric power steering control device, e.g., a lane recognition device for correcting the assist amount of the motor so as to keep within a lane, and added to the assist amount is illustrated. A result of addition of the input supplementary assist signal S9 and the assist correction amount output by the assist map compensation part 111aa1-1 by the input circuit 13e for inputting the supplementary assist signal S9 and an adder 111aa1-3 is set to an instructed current value to the current restriction processing part 111aa1-2.

The adder 111aa1-3 is constructed of the target current control processing part 111aa1, and the input circuit 13e is one of the input circuits of FIG. 1. Moreover, the lane recognition device is an external device included in the sensors, the controlled devices, and the external devices (3a to 3n) of FIG. 1.

When the supplementary assist signal S9 is discontinued in the assist state where the supplementary assist signal S9 is added, or when the addition cannot be carried out due to the current restriction, the abnormality detection part 113 determines that the abnormality is detected. The data storage control part 114 has also stored the supplementary assist signal, the current, and the like in the buffer 11b. Then, when the abnormality is detected, the data storage control part 114 carries out processing of transferring the data to the memory write request buffer 11c, and writing the information at that time, e.g., the current and the supplementary assist signal, to the nonvolatile storage unit 14.

When the driver cannot recognize the state in which the supplementary assist cannot be carried out, verification can be made in which state the assist cannot be carried out by analyzing the written information.

Sixth Embodiment

Figure 10:
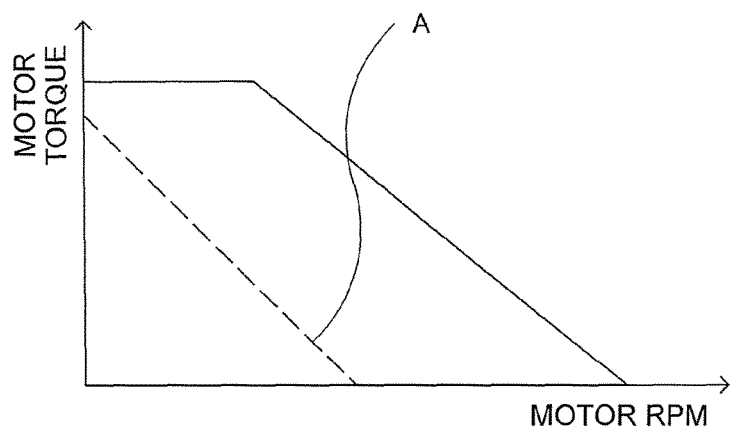
FIG. 10 is a graph for showing control by a control device for a vehicle according to a sixth embodiment of the present invention.

FIG. 10 is a graph for showing control by a control device for a vehicle according to a sixth embodiment of the present invention. In the control unit 10 of FIG. 8, in order to drive the motor, power is supplied from a battery (e.g., the battery 1 of FIG. 1), which is a vehicle power supply, and is supplied as an applied voltage V1 to the motor 55. Therefore, when performance of the battery decreases as indicated by a broken line A of FIG. 10, the voltage to be applied to the motor 55 decreases, the torque generated by the motor and the motor output decrease, and the steering wheel may become difficult to steer. Therefore, the power supply voltage, namely, the voltage of the battery 1 is detected, and when the voltage becomes equal to or less than a predetermined threshold, the abnormality detection part 113 determines that the abnormality is detected. The data storage control part 114 has also stored the current, the power supply voltage, and the like in the buffer 11b. Then, when the abnormality is detected, the data is transferred to the memory write request buffer 11c, and the information at that time, e.g., the current and the power supply voltage, is written to the nonvolatile storage unit 14. Whether or not the performance of the battery decreases when the abnormality occurs can be verified by analyzing the written information. Moreover, regarding the timing of the storage, when the current is restricted for the overheat protection, whether or not the overheat protection control is activated can be analyzed by storing and analyzing the vehicle state information, the control state information, and the monitor information before and after the restriction. Moreover, when the supplementary assist amount is abnormal or cannot be added, a process in which how the supplementary assist amount is abnormally calculated can be analyzed by storing and analyzing the data before the abnormality detection.

Therefore, for example, a timing at which the vehicle state information, the control state information, and the monitor information are stored in the nonvolatile storage unit 14 is switched to any one of before the abnormality detection, before and after the abnormality detection, and after the abnormality detection in accordance with the type of the abnormality in the data storage control part 114. Also for those timings, a table for defining the timings for each of the types of the abnormality is stored in advance in the nonvolatile storage unit 14 or the like.

The present invention is not limited to the respective embodiments described above, and the present invention includes all possible combinations of the respective embodiments.

INDUSTRIAL APPLICABILITY

The control device for a vehicle and the vehicle control method according to the present invention can be applied to various vehicles.

REFERENCE SIGNS LIST

1 battery, 2 ignition switch, 3a-3n sensor, controlled device, external device, 4 actuator, 4a, 4b solenoid coil, 5 diagnostic tool, 10 control unit, 11 control processing unit, 11a temporary storage part, 11b ring buffer, 11c memory write request buffer, 11d timer, 11x calculation part, 12 power supply, 13-13n input circuit, 14 nonvolatile storage unit, 14a-14n memory block, 15 relay, 16a, 16b solenoid drive circuit, 16n drive circuit, 17 relay drive circuit, 18a-18n monitor circuit, 19 communication circuit, 40 controlled device, 51 steering wheel, 52 steering shaft, 53 steering gear box, 55 motor, 55a motor driving machine, 56 pinion mechanism, 57 tire, 111 vehicle control part, 111a power steering control part, 111aa motor drive current calculation part, 111aa1 assist map compensation part, 111aa1 target current control processing part, 111aa1-1 current restriction processing part, 111aa1-2 current restriction processing part, 111aa1-3 adder, 111aa2 subtractor, 112 failure determination part, 113 abnormality detection part, 114 data storage control part, 115 data read control part

The invention claimed is:

1. A control device for a vehicle, the control device comprising:
 a monitor unit configured to monitor a monitor information comprising a state of the vehicle and a control state;
 a nonvolatile storage unit; and
 a control processing unit configured to control the vehicle, the control processing unit comprising:
 a vehicle control part configured to:
 receive an input of a plurality of pieces of vehicle state information on the state of the vehicle,
 calculate a control amount, which is control state information, from the vehicle state information,
 output a control signal for controlling a controlled device, and
 control the monitor unit to monitor the control state,
 an abnormality detection part configured to detect an abnormality based on a state where the vehicle state information or the control state information exists in an abnormality region in which the vehicle state information or the control state information has not reached a failure region corresponding to a failure; and
 a data storage control part configured to:
 store, in a buffer included in the control processing unit, the vehicle state information, the control state information, and the monitor information for a period set in advance while updating the vehicle state information, the control state information, and the monitor information, and
 when the abnormality is detected, store, in the nonvolatile storage unit, the vehicle state information, the control state information, and the monitor information before and after the abnormality is detected, including the vehicle state information, the control state information, and the monitor information that were stored in the buffer,
 wherein the vehicle control part comprises an electric power steering control part configured to control a motor configured to generate an assist torque for assisting a steering torque of a user,
 the electric power steering control part comprises a motor drive current calculation part configured to perform a calculation of a target current value for a motor drive current based on the vehicle state information, the control state information, and the monitor information, the calculation including calculation processing of restricting the motor drive current for protecting the motor or a motor driving machine, and
 the abnormality detection part is further configured to, when the motor drive current is restricted due to overheating, detect the abnormality when the restricted motor drive current becomes equal to or less than a predetermined threshold which is preset based on a preference of the user.

2. The control device for the vehicle according to claim 1, wherein:
 the control processing unit comprises a memory write request buffer; and
 the data storage control part is configured to:
 when the abnormality is detected, transfer, to the memory write request buffer, the vehicle state information, the control state information, and the monitor information that were stored in the buffer before and after the abnormality is detected; and
 subsequently store the vehicle state information, the control state information, and the monitor information in the nonvolatile storage unit.

3. The control device for the vehicle according to claim 2, wherein the data storage control part is configured to:
 select the vehicle state information, the control state information, and the monitor information of a type set in advance for the abnormality detected when the abnormality is detected;
 transfer the selected vehicle state information, control state information, and the monitor information to the memory write request buffer;
 transfer information high in priority of information storage set in advance when a storage region of the nonvolatile storage unit is insufficient; and
 transfer newer information when the same abnormality occurs for a plurality of times.

4. The control device for the vehicle according to claim 2, wherein:
 the control processing unit comprises a failure determination part configured to determine the failure based on a state where the vehicle state information or the control state information exists in the failure region; and the data storage control part is configured to store in the nonvolatile storage unit, the vehicle state information, the control state information, and the monitor information at a time of the determining the failure by the failure determination part independently of the information at a time of the detecting the abnormality.

5. The control device for the vehicle according to claim 3, wherein:

the control processing unit comprises a failure determination part configured to determine the failure based on a state where the vehicle state information or the control state information exists in the failure region; and the data storage control part is configured to store, in the nonvolatile storage unit, the vehicle state information, the control state information, and the monitor information at a time of the determining the failure by the failure determination part independently of the information at a time of the detecting the abnormality.

6. The control device for the vehicle according to claim 1, further comprising a communication circuit configured to communicate to and from a diagnostic tool, which is externally connected, wherein the control processing unit comprises a data read control part configured to read information stored in the nonvolatile storage unit in accordance with a data read command from the diagnostic tool, and to transfer the information to the diagnostic tool via the communication circuit.

7. The control device for the vehicle according to claim 1, wherein:

the vehicle control part is configured to input a temperature of the motor or the motor driving machine configured to drive the motor; and a restriction on the motor drive current by the motor drive current calculation part is imposed to suppress heat generation of the motor or the motor driving machine due to driving of the motor, and the restriction on the motor drive current is carried out in accordance with a pattern set in advance for the temperature of the motor or the motor driving machine.

8. The control device for the vehicle according to claim 1, wherein:

the monitor unit is configured to monitor a power supply voltage of the vehicle;

the abnormality detection part is configured to detect the abnormality when the power supply voltage of the vehicle decreases and becomes equal to or less than a threshold set in advance; and the data storage control part is configured to store the power supply voltage and a current of the vehicle in the buffer, and to store in the nonvolatile storage unit, when the abnormality is detected by the abnormality detection part, the vehicle state information, the control state information, the monitor information, the power supply voltage, and the current of the vehicle before and after the abnormality is detected, including the vehicle state information, the control state information, the monitor information, the power supply voltage, and the current of the vehicle that were stored in the buffer.

9. The control device for the vehicle according to claim 1, wherein:

the motor drive current calculation part is configured to add a supplementary assist amount, which is externally calculated, to calculate the target current value;

the abnormality detection part is configured to detect the abnormality when the supplementary assist amount is abnormal or is not addable; and the data storage control part is configured to store the supplementary assist amount and a current in the buffer, and to store in the nonvolatile storage unit, when the abnormality is detected by the abnormality detection part, the vehicle state information, the control state information, the monitor information, the supplementary assist amount, and the current before and after the abnormality is detected, including the vehicle state information, the control state information, the monitor information, the supplementary assist amount, and the current that were stored in the buffer.

10. The control device for the vehicle according to claim 1, wherein in the data storage control part, a timing at which the vehicle state information, the control state information, and the monitor information are stored in the nonvolatile storage unit is switched to any one of before the abnormality is detected, before and after the abnormality is detected, and after the abnormality is detected in accordance with a type of the abnormality.

11. A vehicle control method, comprising:

a vehicle control step of:
    inputting a plurality of pieces of vehicle state information on a state of a vehicle,
    calculating a control amount, which is control state information, from the vehicle state information,
    outputting a control signal for controlling a controlled device, and
    monitoring, by a monitor unit, a monitor information comprising a control state;

an abnormality detection step of detecting an abnormality based on a state where the vehicle state information or the control state information exists in an abnormality region in which the vehicle state information or the control state information has not reached a failure region corresponding to a failure; and a data storage control step of:
    storing, in a buffer, the vehicle state information, the control state information, and the monitor information for a period set in advance while updating the vehicle state information, the control state information, and the monitor information, and
    when the abnormality is detected, storing, in a nonvolatile storage unit, the vehicle state information, the control state information, and the monitor information before and after the abnormality is detected, including the vehicle state information, the control state information, and the monitor information that were stored in the buffer, wherein the vehicle control method further comprises:
    controlling a motor configured to generate an assist torque for assisting a steering torque of a user, the controlling comprising calculating a target current value for a motor drive current based on the vehicle state information, the control state information, and the monitor information, the calculating further including calculating processing of restricting the motor drive current for protecting the motor or a motor driving machine, and when the motor drive current is restricted due to overheating, detecting the abnormality when the restricted motor drive current becomes equal to or less than a predetermined threshold which is preset based on a preference of the user.

\* \* \* \* \*